United States Patent
Rotheiser

[15] 3,664,466
[45] May 23, 1972

[54] WHEEL WEDGE
[72] Inventor: Jordan I. Rotheiser, Highland Park, Ill.
[73] Assignee: Central Specialties Co., Chicago, Ill.
[22] Filed: Aug. 26, 1970
[21] Appl. No.: 66,982

[52] U.S. Cl. ..................................................188/32
[51] Int. Cl. ...............................................B60t 3/00
[58] Field of Search............................188/4 R, 32

[56] References Cited

UNITED STATES PATENTS

| | | | |
|---|---|---|---|
| 1,237,108 | 8/1917 | Shiel | 188/4 R |
| 2,818,940 | 1/1958 | Boyle | 188/32 |
| 3,387,686 | 6/1968 | Little | 188/32 |
| 3,512,613 | 5/1970 | Peterson | 188/32 |

FOREIGN PATENTS OR APPLICATIONS

| | | | |
|---|---|---|---|
| 922,396 | 1/1955 | Germany | 188/32 |
| 407,877 | 9/1966 | Switzerland | 188/32 |

*Primary Examiner*—Duane A. Reger
*Attorney*—Dominik, Knechtel & Godula

[57] ABSTRACT

A one piece molded bilaterally symmetrical wheel wedge is disclosed having a central supporting web, a planar base flange perpendicular to the supporting web, a rear flange intersecting the base flange and at an acute angle therewith, and a concave upwardly facing rim flange which extends at an acute angle from the forward portion of the base flange to the upper portion of the rear flange. A plurality of generally triangular wheel grip wedges extend laterally of the base flange and the ramp flange.

6 Claims, 4 Drawing Figures

PATENTED MAY 23 1972 3,664,466

INVENTOR
Jordan I. Rotheiser
BY
Dominik, Knechtel & Godula
ATTORNEYS

WHEEL WEDGE

FIELD OF INVENTION

The invention relates to a wheel wedge and more particularly a lightweight one piece molded structure which can be employed as a wheel chock for airplanes, as a wheel wedge for trailers and campers, as well as a safety device for trailers which are used for supporting or towing boats. In addition, of course, many other uses for such a wedge are available and are as plentiful as there are wheeled vehicles which from time to time require support in a fixed position. Wedges which have been made heretofore are oftentimes fabricated of several pieces, or are made of a single piece of wood or a square block of wood. Such devices lack the portability and light weight which is desirable, for example, for carrying in an airplane. Also many of the wheel wedges known in the art, particularly if made of wood, can float away from their intended position in a heavy driving rain which is the exact time when a wedge is needed.

OBJECTS OF INVENTION

In view of the foregoing, it is a primary object of the invention to provide an inexpensive, lightweight, sturdy, one-piece molded wheel wedge which can be securely positioned and self-lockingly engage itself with the wheel to be secured.

Another related object of the invention is to provide a wheel wedge which engages itself securely with both the supporting surface as well as the wheel, and yet is readily removed and may be inserted into position without the need of additional tools, a sledge hammer, and the like.

Still another object of the invention as indicated above broadly is to provide the advantages and achieve the objectives with a unit of modest cost fabricated from a material which gives long life, resists corrosive elements, and is inexpensive.

STATEMENT OF INVENTION

The invention contemplates a one-piece molded bilaterally symmetrical wheel wedge which is generally triangular in configuration, although the upper portion is concaved upwardly to accommodate the rounded surface of the wheel to be engaged. A central support web is provided and three flanges extend therefrom, a base flange, a rear flange, and a ramp flange. Each of the flanges intersects the web at right angles and extends a uniform distance beyond the web. A plurality of generally triangular wheel grip wedges are provided on the upper surface of the ramp flange, and on the bottom surface of the base flange. Each of these wedges is of a substantially right triangular configuration with the base leg of the triangle rearwardly of the intersection between the ramp flange and the base flange. Additionally, the general proportions of the unit are substantially one unit for the width of the flanges, twice that unit for the length of the base, and six times that unit for the radius of curvature of the ramp flange. Thus with a 3-inch flange width, the base is approximately 6 inches long, and the radius of curvature of the upper ramp flange is 18 inches.

DESCRIPTION OF DRAWINGS

Further objects and advantages of the present invention will become apparent as the following description of an illustrative embodiment takes place in conjunction with the accompanying drawings, in which.

DESCRIPTION OF PREFERRED EMBODIMENT

Figure 1:
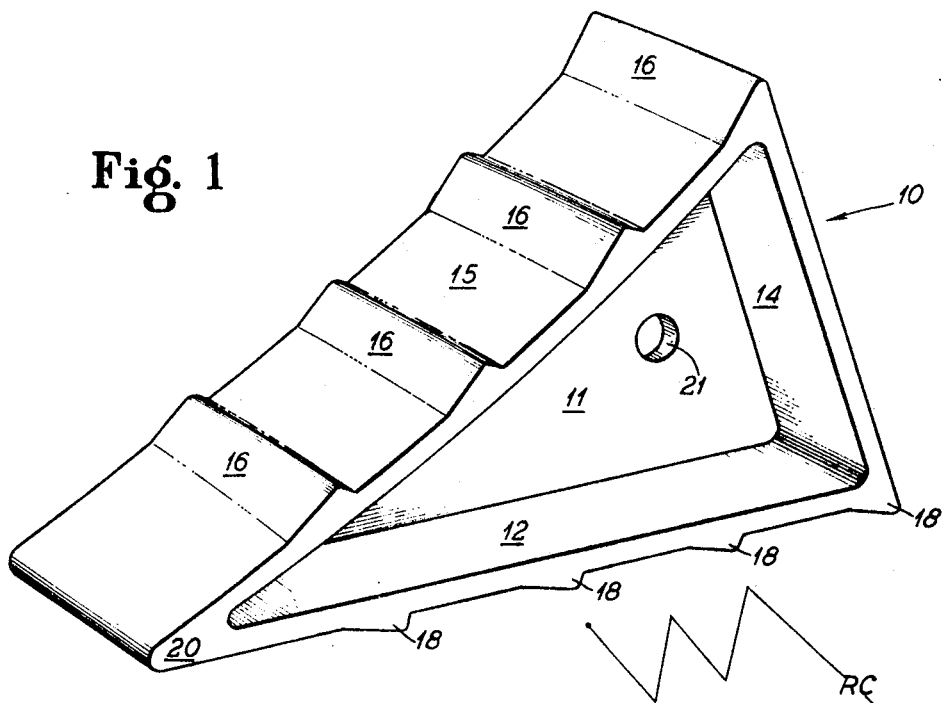
FIG. 1 is a perspective view showing the upper portion of the ramp flange and wheel wedge illustrative of the present invention.

The wheel wedge 10 illustrative of the present invention is shown in FIG. 1 in perspective. There it will be seen that the backbone of the unit is a center web 11 which is generally imperforate with the exception of an optionally provided hole or rope tug mount 21. At the bottom of the web 11 and extending laterally and perpendicularly thereto is the base flange 12. Rearwardly of the unit is the rear flange 14 which extends upwardly at an acute angle with the base flange 12. A ramp flange 15 is provided atop the center web 11 and at its rear end portion engages the upper end of the rear flange 14, and at its forward portion blends in with the forward portion of the base flange 12 to intersect at a wheel point 20.

To insure the lightweight construction just described against inadvertent dislodgment it will be observed that a plurality of grip wedges 16 are provided on the ramp flange 15 with a cross-section substantially that of a right triangle, the base leg of which faces rearwardly, and the vertex of which faces forwardly in the general direction of the wheel point 20.

Figure 4:
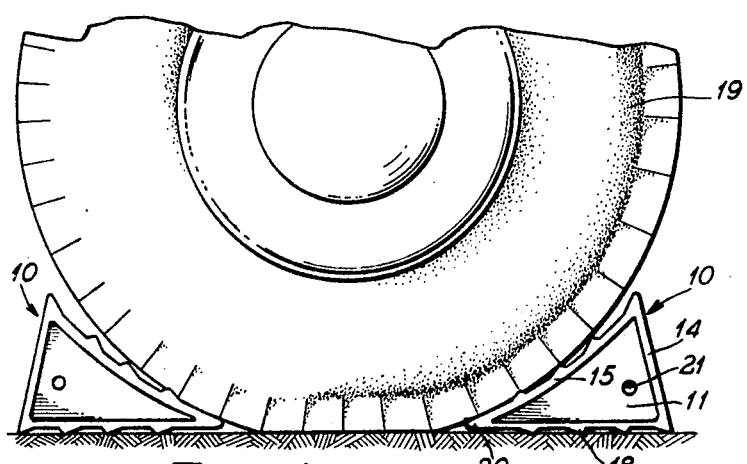
FIG. 4 is an illustrative view of the subject wheel wedge positioned adjacent a vehicle wheel.

Similarly, the base 12 is provided with a plurality of grip wedges 18 also in the configuration of a right triangle, and also at the vertex of the right triangle pointing in the general direction of the wheel point 20. As will be particularly observed in FIG. 2, a line of tangency illustrative of the ground or other flat surface upon which the wheel wedge 10 is mounted, running through the bottom portion of the grip wedges 18 of the base extends outwardly and below and in spaced relationship with the wheel point 20. Thus in operation, as illustrated in FIG. 4, as the wheel wedge 10 is inserted either by hand or kicked by the foot beneath the wheel 19, the wheel point 20 will tend to seek the spot closest the point of intersection between the vehicle wheel 19 and the ground surface. Simultaneously the wedges 16, 18 on the ramp flange 15 and the base flange 12 will grip against their respective vehicle wheel surface and ground surface.

Figure 3:
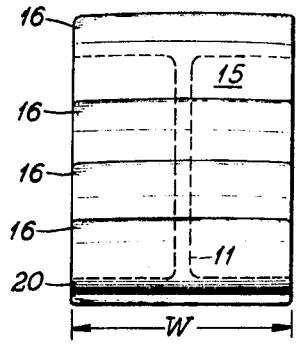
FIG. 3 is an end view taken from the left end of the wheel wedge shown in FIG. 2.
Figure 2:
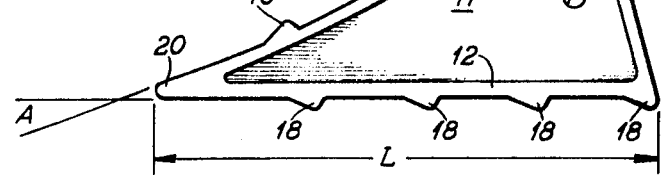
FIG. 2 is a plan view of the wheel wedge shown in FIG. 1 in smaller scale.

The proportions of the subject wheel wedge 10, particularly as noted in FIGS. 2 and 3, contribute to its unusual advantages. By reference to those figures it will be noted that "W" denotes the width of all three of the flanges; namely, the base flange 12, the rear flange 14, and the ramp flange 15. In a highly desirable commercial embodiment, this width is 3 inches. In the same commercial embodiment, the length of the base flange 12 is slightly in excess of 6 inches; namely, 6¾ inches. This length is denoted by the letter "L" in FIG. 2. The beginning angle for the incline of the ramp flange 15 as it intersects the base flange 12 is indicated by the "A" shown in FIG. 2 which desirably is 25°. To complete the design in appropriate proportions for a wheel wedge, a radius "RC" is shown, radius of curvature of the ramp flange 15, which in a desirable commercial embodiment is 18 inches. Therefore, in terms of ideal proportions, assuming the width of the base flange 12 to be one unit, the radius of curvature of the ramp flange 15 should be six times that unit. Additionally, the length of the base should be approximately double the width of the ramp flange 15, or alternatively approximately one-third of the radius of curvature. It is recognized that minor departures from these proportions can be tolerated without significantly affecting the utility of the unit, but significant departures, such as, for example, making the base flange 12 the same length as the width of the base flange 12, or alternatively making the width one-tenth of the length of the base flange 12 will provide instability, and lose the desirable features and advantages of the proportions just described as ideal.

In review it will be seen that a wheel wedge has been disclosed and described which is readily moldable from one piece of plastic. While the selection of plastic is not an essential ingredient of the invention, it has been found that a linear polyethylene, particularly with a web wall thickness of 0.187 inch and flange thicknesses of 0.187 inch is highly desirable. This in combination with wheel grip flanges of approximately 0.125 inch in overall height with a 0.062 inch typical radius at the upper portion and the portion blending in with the face of the base flange 12 or the ramp flange 15 has been highly acceptable commercially, and resists dislodgment and otherwise provides the functions desired of the unit.

Although particular embodiments of the invention have been shown and described in full here, there is no intention to thereby limit the invention to the details of such embodiments. On the contrary, the intention is to cover all modifications, alternative embodiments, usages and equivalents of a wheel wedge as fall within the spirit and scope of the invention, specification, and the appended claims.

What is claimed is:

1. A one-piece molded bilaterally symmetrical wheel wedge comprising, in combination,
   a central supporting web having parallel planar substantially imperforate faces,
   a planar base flange extending laterally in perpendicular relation to the supporting web,
   a rear flange intersecting the base flange at an acute angle upwardly from the base flange,
   a concave upwardly facing ramp flange extending laterally from the upper portion of the web and intersecting the base flange forming a wheel engaging point at the forward portion of the wedge, and intersecting the rear flange at its rearward portion,
   said base flange, rear flange, and ramp flange having proportions including one unit for the width of the base flange, a two unit length for said base flange, and a radius of curvature for the ramp flange, substantially six times the single unit width of the aforesaid recited flanges,
   a plurality of generally triangular wheel grip wedges on the upper face of the ramp flange with their bases remote from the wheel engaging point and extending laterally across the upper portion of the ramp flange,
   and a plurality of generally triangular ground engaging wedges extending laterally across the base flange bottom with their bases remote from the wheel point.

2. In the wheel wedge of claim 1 above, wall thicknesses of the web, base flange, rear flange, and ramp flange approximating a ratio of 0.54 to 0.57 of the one unit designated as the width of the aforesaid flanges.

3. In the wheel wedge of claim 1 above,
   said wheel grip wedges being of the same number on the ramp flange as on the base flange.

4. In the wheel wedge of claim 3 above,
   at least three grip wedges on the ramp flange and at least three grip wedges on the base flange.

5. In the wheel wedge of claim 1
   a wheel engaging point defined at the intersection of the ramp flange and the base flange,
   said wheel engaging point being at a position generally above a line of tangency through the lowermost portion of the base wheel grip wedges.

6. In the wheel wedge of claim 1,
   means defining a rope tug haul in the otherwise substantially imperforate web.

* * * * *